(12) United States Patent
Malone

(10) Patent No.: US 9,418,266 B1
(45) Date of Patent: Aug. 16, 2016

(54) TRACKING OILFIELD ASSETS WITH A UNIVERSAL IDENTIFICATION PROTOCOL

(71) Applicant: Halliburton Energy Services, Inc., Houston, TX (US)

(72) Inventor: Michael Eugene Malone, Fulshear, TX (US)

(73) Assignee: Halliburton Energy Services, Inc., Houston, TX (US)

(*) Notice: Subject to any disclaimer, the term of this patent is extended or adjusted under 35 U.S.C. 154(b) by 282 days.

(21) Appl. No.: 14/037,886

(22) Filed: Sep. 26, 2013

(51) Int. Cl.
G06F 11/26 (2006.01)
G08B 13/14 (2006.01)
G08B 1/08 (2006.01)
H04B 1/00 (2006.01)
G06K 7/10 (2006.01)

(52) U.S. Cl.
CPC .................................. G06K 7/10366 (2013.01)

(58) Field of Classification Search
CPC .......... G06F 11/26; G06F 17/30; G08B 13/14
USPC ............. 340/8.1, 572.2, 572.7; 702/188, 180, 702/34, 41, 127; 73/152.03
See application file for complete search history.

(56) References Cited

U.S. PATENT DOCUMENTS

| | | | |
|---|---|---|---|
| 5,360,967 A | 11/1994 | Perkin et al. | |
| 6,119,132 A * | 9/2000 | Kuwano | H04N 1/2166 |
| 6,604,063 B2 * | 8/2003 | Denny | E21B 17/006 |
| | | | 702/188 |
| 6,850,161 B1 * | 2/2005 | Elliott | E21B 47/02224 |
| | | | 340/539.1 |
| 6,973,416 B2 | 12/2005 | Denny et al. | |
| 7,180,422 B2 * | 2/2007 | Milenkovic | G08B 21/0261 |
| | | | 235/375 |
| 7,233,958 B2 * | 6/2007 | Weng | G06K 17/0029 |
| | | | 707/693 |
| 7,303,123 B2 * | 12/2007 | Roberts | G06Q 10/087 |
| | | | 235/383 |
| 7,962,319 B2 | 6/2011 | Grayson | |
| 7,963,452 B2 | 6/2011 | Moritz | |
| 8,135,862 B2 | 3/2012 | Singh et al. | |
| 8,185,744 B2 * | 5/2012 | Brown | H04L 9/3066 |
| | | | 340/12.51 |
| 8,402,058 B2 | 3/2013 | Conner et al. | |
| 9,030,324 B2 * | 5/2015 | Christiansen | H04Q 9/00 |
| | | | 340/12.18 |
| 2007/0145129 A1 | 6/2007 | Perkin et al. | |
| 2009/0322510 A1 * | 12/2009 | Berger | H04W 60/00 |
| | | | 340/539.1 |
| 2010/0065636 A1 * | 3/2010 | Byun | G06Q 10/087 |
| | | | 235/435 |
| 2010/0179963 A1 * | 7/2010 | Conner | G01C 21/32 |
| | | | 707/769 |

* cited by examiner

Primary Examiner — Nam V Nguyen
(74) Attorney, Agent, or Firm — McDermott Will & Emery LLP; John Wustenberg

(57) ABSTRACT

Systems and methods for tracking assets are provided. In some aspects, a method includes generating a tracking identifier for an asset and storing the tracking identifier in a wireless tag associated with the asset. The tracking identifier includes a protocol identifier that identifies a protocol used for generating the tracking identifier. The tracking identifier also includes an asset identifier that identifies a class to which the asset belongs. The tracking identifier also includes at least one data load that identifies an element specific to the asset. The tracking identifier also includes at least one data load type identifier that identifies a type of a corresponding element specific to the asset or provides an end-of-data indication. The tracking identifier also includes at least one data load size identifier that identifies a size of a corresponding data load.

19 Claims, 3 Drawing Sheets

200

HAL-B 1 3 11 Halliburton 1 8 034453-B 0
 A    B C D      E         F G    H    I

TRACKING OILFIELD ASSETS WITH A UNIVERSAL IDENTIFICATION PROTOCOL

BACKGROUND

The present disclosure is related to oilfield operations and, more particularly, to positively identifying oilfield assets using a universal identification protocol.

In the exploration for, accessing of, and production of hydrocarbons in the oil and gas industry, numerous pieces of oilfield equipment or "assets" are used. Such assets include, but are not limited to, casing, drill pipe, production pipe, packers, drill bits, pumping equipment, valving equipment, and other related equipment. The cost to obtain and maintain this equipment can be quite high, therefore well operators tend to use and/or reuse many pieces of oilfield equipment for subsequent drilling and development operations. As a result, a single asset may be used in multiple operations.

However, such oilfield equipment and assets undergo considerable stress during drilling and completion operations. For example, assets such as drill pipe or discharge manifold equipment may suffer from material fatigue that may ultimately result in its failure. The failure of such equipment requires the cessation of well operations until the failed asset can be repaired or replaced altogether. As will be appreciated, this can be an expensive and time-consuming process. Accordingly, it is desirable to accurately track oilfield assets and maintain complete service records relating to such assets for the purposes of determining fatigue and other factors relating to their use. Thus, oilfield assets can preemptively be taken out of use before such assets fail.

Oilfield assets are oftentimes tracked using radio-frequency identification (RFID) tags attached to the oilfield asset. Upon detecting a particular RFID with an RFID reader, an operator is able to identify the oilfield asset. Currently, however, there is no industry standard for RFID tagging and no universal RFID protocol. As a result, RFID tagging of oilfield assets can vary, for example, between manufacturers, drilling companies, and/or even from well site to well site, thereby causing communication obstacles and operation delays until an oilfield asset is positively identified.

BRIEF DESCRIPTION OF THE DRAWINGS

The following figures are included to illustrate certain embodiments of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to oilfield operations and, more particularly, to positively identifying oilfield assets using a universal identification protocol.

According to various embodiments of the subject technology, systems and methods for tracking assets are provided. In some embodiments, tags that are coupled to assets may be encoded with asset identification information in a universal RFID protocol so that the information can be categorized and tracked in a uniform manner from well site to well site. Furthermore, the universal RFID protocol provides a data structure that not only allows additional information to be appended to previously encoded information, but also allows for the encoded information to be extracted in a quick and straightforward manner.

Figures 1, 2:
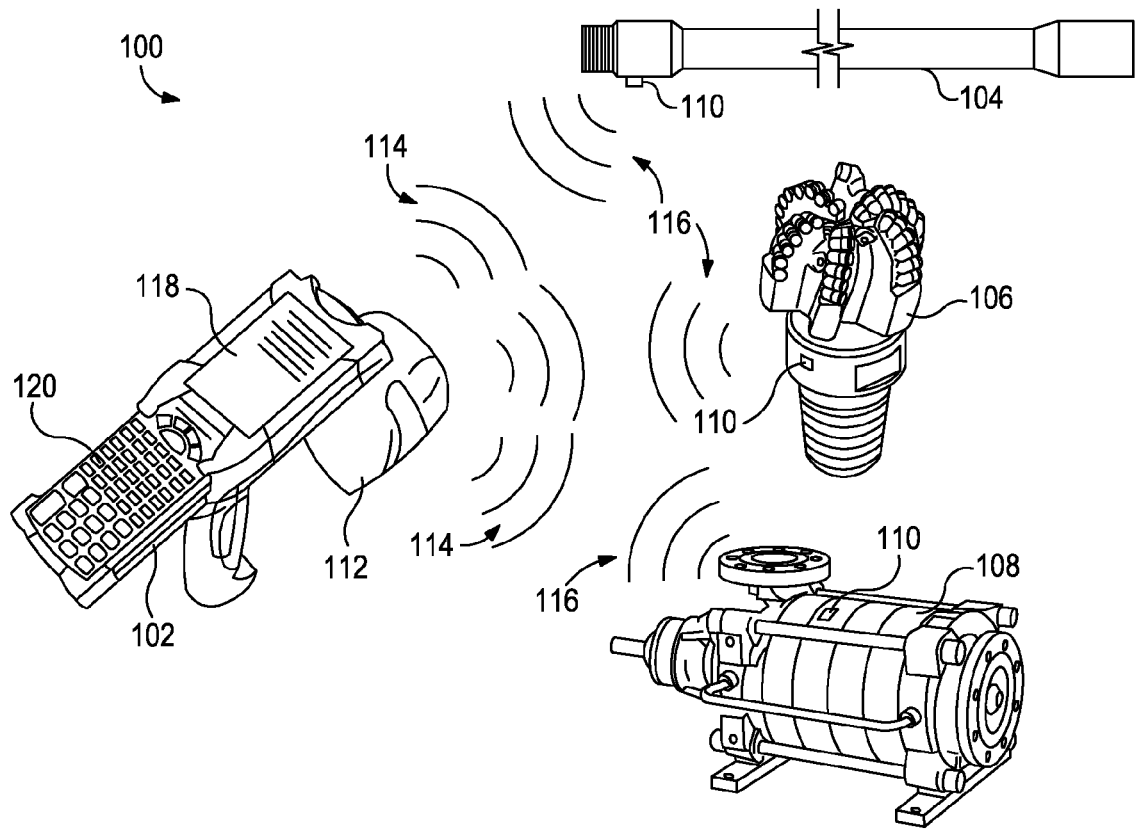
FIG. 1 illustrates an exemplary system used for identifying oilfield assets, in accordance with various embodiments of the subject technology.
FIG. 2 illustrates an example of a tracking identifier encoded according to the protocol provided by various embodiments of the subject technology.

Referring to FIG. 1, illustrated is an exemplary system 100 used for identifying oilfield assets, according to one or more embodiments. As used herein, the term "oilfield asset" refers to equipment, tools, and devices used primarily in the oil and gas industry. Exemplary oilfield assets include, but are not limited to, casing, drill pipe, production pipe, packers, drill bits, pumping equipment, valving equipment, well heads (e.g., frac heads, Christmas trees, blow out preventers, etc.), manifold trailers, mixers and related mixing equipment, shakers, centrifuges, hydrocyclones, separators, filters, heat exchangers, sensors, gauges, motors (e.g., topside or downhole), floats, drill collars, transport or delivery equipment, and the like.

As illustrated, the system 100 may include a reader 102 adapted to positively identify a plurality of oilfield assets, such as a tubular 104, a drill bit 106, and a pump 108. As will be appreciated, the tubular 104, the drill bit 106, and the pump 108 are merely illustrative oilfield assets used for descriptive purposes only. Those skilled in the art will readily recognize that any of the oilfield assets defined above may be identified with the reader 102 without departing from the scope of the disclosure. Moreover, while the present description is related to use in the oil and gas industry, it will be appreciated that the principles disclosed herein may be equally applied to other technologies and fields. Indeed, the present description may be applicable to any technological field where assets (i.e., equipment, tools, devices, etc.) are desired to be tracked and identified with a universal tracking and/or identification protocol.

The reader 102 may be a radio-frequency identification (RFID) reader capable of detecting RFID tags 110 coupled or otherwise attached to each oilfield asset. In some embodiments, the RFID tag 110 may be coupled to the exterior surface of the corresponding oilfield asset. In other embodiments, the RFID tag 110 may be embedded within the body of the corresponding oilfield asset. In yet other embodiments, the RFID tag 110 may be arranged inside of the corresponding oilfield asset. As will be appreciated, the RFID tag 110 may be arranged at any location on an oilfield asset so long as the reader 102 is able to properly interact therewith. Although radio frequency communications are described herein between readers and tags, it is understood that other types of wireless communications may be used, including, but not limited to near-field communications, Wi-Fi communications, BLUETOOTH® communications, and the like. For example, in some embodiments, near-field communication readers may extract asset identification information from near-field communication tags attached to the assets.

In some embodiments, as illustrated, the reader 102 may be a portable, hand-held device. For instance, the reader 102 may be the commercially-available MOTOROLA 9090z hand-held RFID reader or a similar RFID reader. In other embodiments, however, the reader 102 may be stationary and the oilfield assets may instead be brought into proximity of the reader 102 such that positive identification may be undertaken.

In some embodiments, the RFID tags 110 may be passive circuits and therefore do not require an internal power source and are only active when the reader 102 is nearby to power them. For example, the passive circuits may be powered by one or more signals emitted by the reader 102. In other embodiments, however, the RFID tags 110 may be semi-passive or active circuits that require a power source (e.g., a small battery or the like) and respond to queries from the reader 102 by generating response signals that contain the information about the oilfield asset to which the RFID tag 110 is attached. Further, an active circuit having its own power source may be capable of transmitting signals over greater distances than passive circuits. In any case, the RFID tag 110 may be configured as read-only, or alternatively be configured as read/write.

The reader 102 may include an antenna 112 configured to receive a unique identification code from each RFID tag 110. The antenna 112 may be communicably coupled to the reader 102 or, alternatively, the antenna 112 and the reader 102 may be integrally formed, without departing from the scope of the disclosure. The antenna 112 may be adapted to transmit a request signal 114 to each RFID tag 110, and the RFID tag 110 may transmit a response signal 116 back to the reader 102. Each RFID tag 110 may be tuned to the request signal 114, and the response signal 116 may encompass the unique identification code stored within each RFID tag 110, thereby sending an identifying code for the particular oilfield asset.

The reader 102 may be configured to receive the coded response signal 116 from the RFID tag 110 and decode the transmission to arrive at a unique identification corresponding exclusively to that particular RFID tag 110. The reader 102 may then access a central database (not shown) which stores and otherwise maintains information relating to each oilfield asset. For example, the central database may include information relating to what type of oilfield asset is identified, the number of times the oilfield asset has been used, the type of environment the oilfield asset has operated in, date of last usage and special conditions encountered in each use, the manufacturer of the oilfield asset, the serial number for the oilfield asset, and other data relating to each oilfield asset.

Based on the information stored in the central database, the reader 102 may be configured to visually display such information and data to a user. For instance, the reader 102 may further include a display 118 adapted to provide the user with the retrieved data corresponding to the particular oilfield equipment being detected through its respective RFID tag 110. The reader 102 may further include a keypad 120 for the input of additional information corresponding to the oilfield assets into the central database.

As discussed above, there is currently no standard RFID protocol for oilfield assets tagged with RFID chips. According to various embodiments of the subject technology, an RFID data protocol that enables tracking of oilfield equipment is provided. The protocol, which may be referred to as HAL-B, may be used as a standard in the industry. An RFID data structure provided by the RFID data protocol may be a basis for reusable RFID code. The standard can be expanded to meet any type of material.

According to certain embodiments, the RFID data protocol may be used to generate a tracking identifier that may be encoded into a tag, such as the RFID tag 110 shown in FIG. 1. The tracking identifier can include any information for identifying a particular asset. In some embodiments, the tracking identifier may include a protocol identifier that identifies a protocol used for generating the tracking identifier. For example, the protocol identifier may indicate that HAL-B is the RFID data protocol used to generate the tracking identifier.

The tracking identifier may also include an asset identifier that identifies a class to which the asset belongs. For example, the following table displays a listing of classes that can be identified by the asset identifier:

TABLE 1

| Number | Description |
| --- | --- |
| 1 | Iron/Discharge Manifold Equipment |
| 2 | General Vehicle |

As shown in Table 1, a value of 1 assigned to the asset identifier may indicate that the class of a particular asset may be an iron/discharge manifold equipment class, while a value of 2 assigned to the asset identifier may indicate that the class of the particular asset may be a general vehicle class. This correlation, for example, may be stored in the central database discussed above. Although Table 1 only shows two classes, it is understood that the asset identifier may identify any number of classes that are different from the iron/discharge manifold equipment class or the general vehicle class.

In some embodiments, the tracking identifier may include a data load that identifies an element specific to the asset. The tracking identifier may also include a data load type identifier that identifies a type of the element specific to the asset or provides an end-of-data indication. For example, the following table displays a listing of types and an end-of-data indication that can be identified by the data load type identifier:

TABLE 2

| Number | Description |
| --- | --- |
| 0 | Data Loads/Encoding Complete |
| 1 | Manufacturer Serial Number |
| 2 | SAP Equipment ID |
| 3 | Manufacturer Name |

As shown in Table 2, a value of 0 assigned to the data load type identifier may provide the end-of-data indication. A value of 1 assigned to the data load type identifier may indicate that the element identified by the data load is a manufacturer serial number. A value of 2 assigned to the data load type identifier may indicate that the element identified by the data load is a SAP equipment identification. A value of 3 assigned to the data load type identifier may indicate that the element identified by the data load is a manufacturer name. This correlation, for example, may be stored in the central database discussed above. Although Table 2 only shows three types, it is understood that the data load type identifier may identify any number of types that are different from the manufacturer serial number type, the SAP equipment identification type, or the manufacturer name type.

In some embodiments, the tracking identifier may include a data load size identifier that identifies a size of a corresponding data load. The data load, as well as the protocol identifier, the asset identifier, the data load type identifier, and the data load size identifier, can be any size provided that the RFID tag 110 has a large enough memory to store the tracking identifier. If the memory of the RFID tag 110 is limited, the size of each of these fields of the tracking identifier may be limited.

Furthermore, the manner in which each field is encoded may impact the data size of the tracking identifier, thus how much memory is required on the RFID tag 110 to store the tracking identifier. Each field of the tracking identifier can be encoded such that asset identification information associated with a corresponding field may be extracted either directly from the tracking identifier itself or indirectly via a look up of the central database. In the examples described above with respect to Tables 1 and 2, the asset identifier and the data load type identifier are encoded such that their corresponding asset identification information may be extracted indirectly via a "look up" or query of the central database (e.g., the reader 102 may obtain the value assigned to the asset identifier and/or data load type identifier from the tracking identifier and look up the corresponding definition of the value from the central database). This indirect method of encoding allows less information to be encoded within the tracking identifier, thereby reducing the data size of the tracking identifier.

In some embodiments, however, the protocol identifier, the data load size identifier, and the data load may be encoded such that their corresponding asset identification information can be extracted directly from the tracking identifier itself. For example, the protocol identifier and/or the data load can be encoded in the American Standard Code for Information Interchange (ASCII), while the data load size identifier may be encoded such that a number (e.g., represented in binary) indicating a number of bytes of the data load is provided. The advantage of this direct method of encoding is that the asset identification information corresponding to these fields can be quickly ascertained without having to look up the central database.

According to certain embodiments, a size of the protocol identifier may be at least five bytes (e.g., each byte may be an ASCII character), a size of the asset identifier may be at least one byte (e.g., to specify at least 256 different classes), a size of the data load type identifier may be at least one byte (e.g., to specify at least 255 different types and one end-of-data indication), and a size of the data load size identifier may be at least one byte (e.g., to specify at least a 256 byte size for the data load). The size of the data load can vary depending on the number of characters needed to describe the element identified by the data load. In some embodiments, the size of the data load may be at least several bytes, with each byte being an ASCII character, in order to allow the element to be sufficiently described (e.g., a serial number specific to a particular asset, a manufacturer name specific to a particular asset, etc.).

Referring now to FIG. 2, illustrated is an example of a tracking identifier 200 encoded according to the protocol provided by various embodiments of the subject technology. As shown in FIG. 2, segment A of the tracking identifier 200 includes a protocol identifier that is made up of five ASCII characters. In this example, the protocol identifier indicates that the HAL-B protocol is being used. Segment B of the tracking identifier 200 is the sixth byte of the tracking identifier 200 and includes an asset identifier. In this example, the asset identifier is assigned the value of 1, which indicates that the asset associated with the tracking identifier 200 is a piece of discharge manifold equipment (e.g., according to Table 1 above).

Segment C of the tracking identifier 200 is the seventh byte of the tracking identifier 200 and includes a data load type identifier. In this example, this data load type identifier is assigned the value of 3, which indicates that the element identified by the corresponding data load of the tracking identifier 200 contains the manufacturer of the asset (e.g., according to Table 2). Segment D of the tracking identifier 200 is the eighth byte of the tracking identifier 200 and includes a data load size identifier. In this example, this data load size identifier indicates that the element of the corresponding data load contains 11 characters (note that this data load size identifier may be encoded in binary form but is shown as "11" in FIG. 2 for simplicity). Segment E of the tracking identifier 200 is the ninth through $19^{th}$ byte of the tracking identifier 200 and includes the element identified by the corresponding data load, which is made up of 11 ASCII characters. In this example, the element identified by the corresponding data load indicates that "Halliburton" is the manufacturer of the asset.

Segment F of the tracking identifier 200 is the $20^{th}$ byte of the tracking identifier 200 and includes a second data load type identifier, as did segment C. In this example, this data load type identifier of segment F is assigned the value of 1, which indicates that the element of the corresponding data load of the tracking identifier 200 contains the serial number (e.g., according to Table 2). Segment G of the tracking identifier 200 is the $21^{st}$ byte of the tracking identifier 200 and includes a second data load size identifier, as did segment D. In this example, this data load size identifier of segment G indicates that the element of the corresponding data load contains 8 characters (note that this data load size identifier may be encoded in binary form but is shown as "8" in FIG. 2 for simplicity).

Segment H of the tracking identifier 200 is the $22^{nd}$ through $29^{th}$ byte of the tracking identifier 200 and includes the element identified by the corresponding data load, which is made up of 8 ASCII characters. In this example, the element identified by the corresponding data load indicates that "034453-B" is the serial number of the asset. Segment I of the tracking identifier 200 is the $30^{th}$ byte of the tracking identifier 200 and includes a third data load type identifier. In this example, this data load type identifier is assigned the value of 0, which indicates that there are no additional data loads and encoding is complete (e.g., according to Table 2).

According to certain embodiments, the fields of the tracking identifier may be arranged in the following order: the protocol identifier, followed by the asset identifier, followed by the data load type identifier, followed by the data load size identifier, followed by the data load. The benefit of such an order is that when the reader 102 receives the tracking identifier, the reader 102 can quickly determine whether the tracking identifier is one that the reader 102 recognizes and is able to decode, such as the RFID data protocol, because the protocol identifier is at the beginning of the tracking identifier. If the detected protocol is not one that the reader 102 recognizes, the reader 102 can disregard the tracking identifier. If the detected protocol is one that the reader 102 recognizes, the reader 102 may then determine the class to which the asset belongs (e.g., from the asset identifier). Afterwards, the reader 102 may use the data load type identifier and the data load size identifier to locate and/or extract the data load.

The order in which the fields of the tracking identifier are arranged also allows for additional data loads (and corresponding data load type identifiers and data load size identifiers) to be appended to the tracking identifier. For example, if there is a second data load (with a corresponding second data load type identifier and a second data load size identifier) to be provided as part of the tracking identifier, the first data load may be followed by the second data load type identifier, which may be followed by the second data load size identifier, which may be followed by the second data load. Additional data loads and corresponding data load type identifiers and data load size identifiers may continue to be appended in this manner until there are no more data loads to be appended and/or the additional data loads create a tracking identifier of a size larger than the RFID tag 110 memory. In the first case, a last data load type identifier that provides the end-of-data indication may be appended to the last appended data load.

Although the fields of the tracking identifier are described as being arranged in the foregoing order, it is understood that the fields may be arranged in a different order as long as the reader 102 can extract the information from the tracking identifier. For example, according to some embodiments, the data load type identifier and the data load size identifier may be swapped in the following manner: the protocol identifier, followed by the asset identifier, followed by the data load size identifier, followed by the data load type identifier, followed by the data load, followed by another data load type identifier that provides an end-of-data indication (e.g., assuming there are no additional data loads to append).

Figure 3:
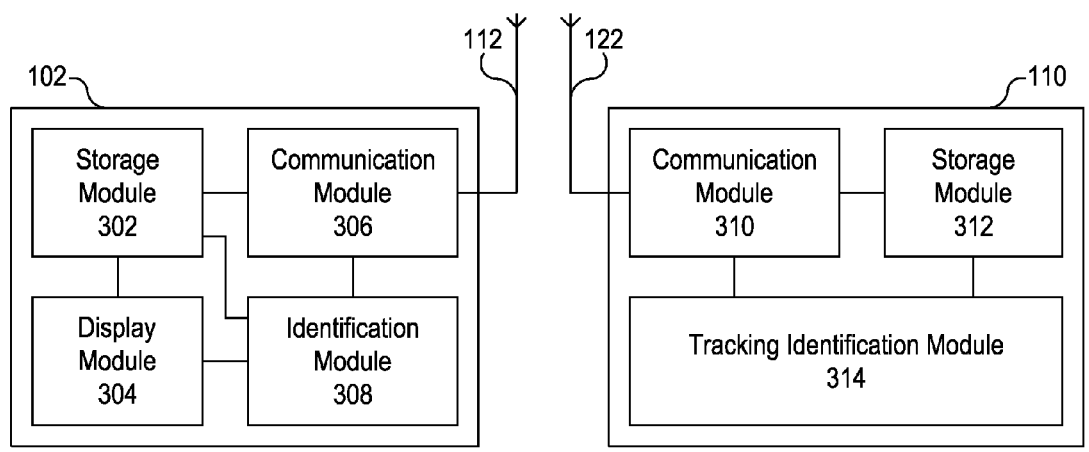
FIG. 3 is a block diagram that schematically illustrates a reader and a tag, in accordance with various embodiments of the subject technology.

FIG. 3 is a block diagram that schematically illustrates the reader 102 and the RFID tag 110, in accordance with various embodiments of the subject technology. The reader 102 comprises a storage module 302, a display module 304, an identification module 308, and a communication module 306 coupled to the antenna 112. These modules may be in communication with one another. The RFID tag 110 comprises a storage module 312, a tracker identification module 314, and a communication module 310 coupled to an antenna 122. These modules may be in communication with one another. The reader 102 and the RFID tag 110 may wirelessly communicate with one another via the antennas 112 and 122.

In some embodiments, the modules of the reader 102 and/or the modules of the RFID tag 110 may be implemented in software (e.g., subroutines and code). In some embodiments, some or all of these modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various embodiments of the subject technology are further described in the present disclosure.

Figure 4:
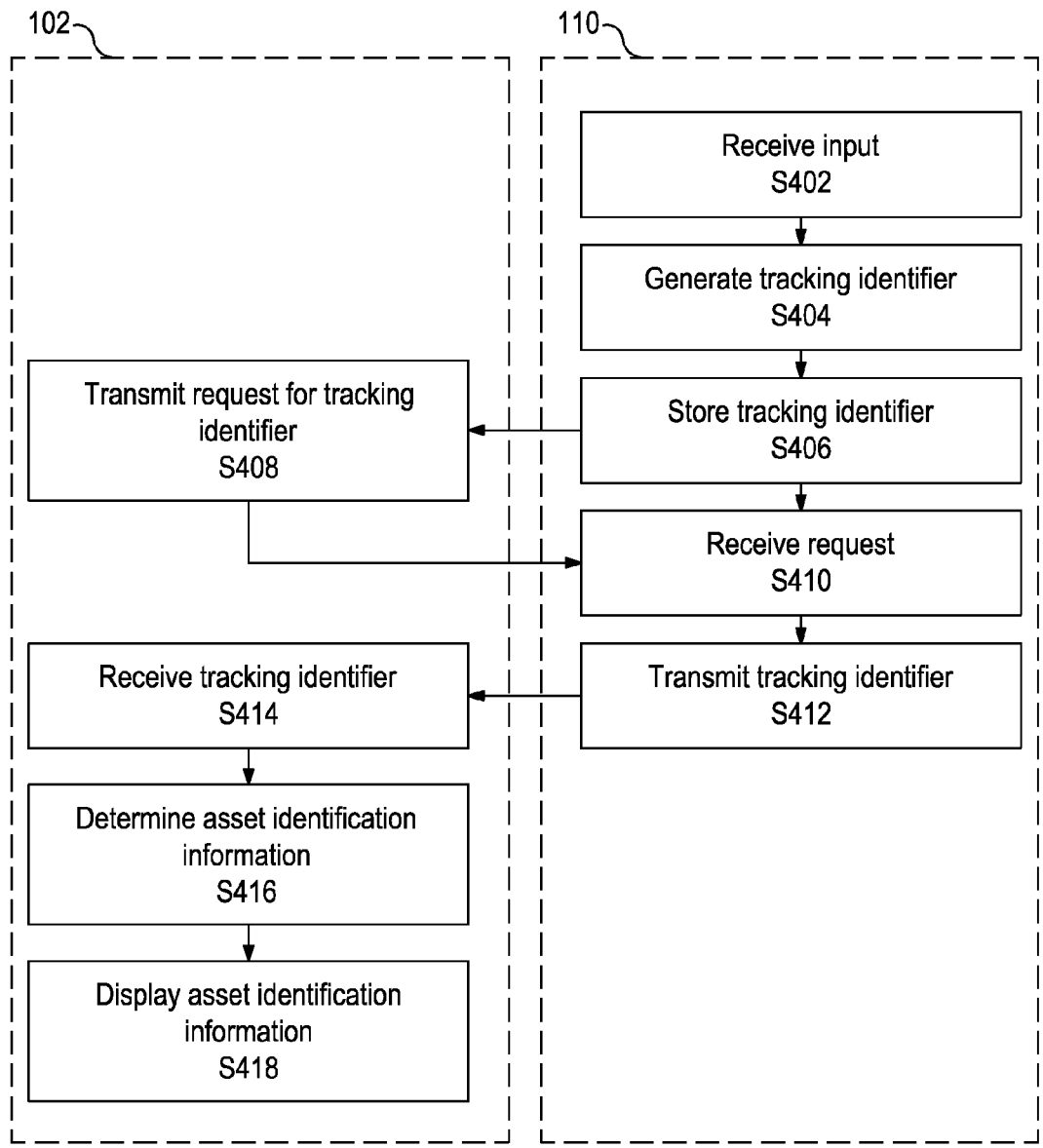
FIG. 4 illustrates an example of a method for tracking assets, in accordance with various embodiments of the subject technology.

FIG. 4 illustrates an example of a method 400 for tracking assets, in accordance with various embodiments of the subject technology. The method 400 may be implemented by the reader 102 and/or the RFID tag 110. However, the method 400 may also be implemented by communication devices having other configurations. Although the method 400 is described herein with reference to the examples of FIGS. 1 and 3, the method 400 is not limited to these examples. Furthermore, the method 400 may be implemented in an order different from the one shown in FIG. 4.

The method 400 comprises the processes S402, S404, S406, S408, S410, S412, S414, S416, and S418. The processes S402, S404, S406, S410, and S412 may be implemented by the RFID tag 110, and therefore are shown in FIG. 4 as being within the RFID tag 110. The processes S408, S414, S416, and S418 may be implemented by the reader 102, and therefore are shown in FIG. 4 as being within the reader 102. Although the processes implemented by the RFID tag 110 and the reader 102 are described as being part of the method 400, the processes implemented by the RFID tag 110 may, in certain embodiments, be considered a separate method from the processes implemented by the reader 102.

According to the process S402, communication module 310 of the RFID tag 110 may receive an input to generate a tracking identifier for an asset associated with the RFID tag 110 (e.g., an asset to which the RFID tag 110 is coupled). For example, a user may provide the RFID tag 110 with the protocol, a class to which the asset belongs, a data load that identifies an element specific to the asset, the type of the element, the size of the data, and/or other information for tracking and/or identifying the asset.

According to the process S404, the tracker identification module 314 may generate the tracking identifier based on the input received in the process S402. In some embodiments, the tracker identification module 314 may arrange the information from the received input in a format compatible with the HAL-B data protocol to generate the tracking identifier. Although the tracker identification module 314 is described as arranging the information in this manner, it is understood that the received input, according to certain embodiments, may already provide information arranged in the format compatible with the HAL-B data protocol.

According to the process S406, the storage module 312 of the RFID tag 110 may store the tracking identifier so that it may be accessed at a later time. According to the process S408, the communication module 306 of the reader 102 may transmit to the RFID tag 110 a request for the tracking identifier. According to the processes S410 and S412, the communication module 310 may receive the request for the tracking identifier and transmit to the reader 102 the tracking identifier stored in the storage module 312 in response to receiving the request. According to the process S414, the communication module 306 may receive the tracking identifier from the communication module 310.

According to the process S416, the identification module 308 of the reader 112 may determine asset identification information based on the received tracking identifier. For example, the asset identification information may be any information that can be extracted and/or decoded from the tracking identifier to identify one or more aspects of the asset. In some embodiments, the asset identification information comprises the protocol, the class to which the asset belongs, an element specific to the asset and identified by a data load of the tracking identifier, the type of the element, the size of the data load, an end-of-data indication, and/or any other information that can be extracted and/or decoded from the tracking identifier to identify the one or more aspects of the asset.

According to the process S418, the display module 304 may display the asset identification information determined in the process S416. For example, the asset identification information may be displayed in the display 118 of the reader 102 (FIG. 1).

Figure 5:
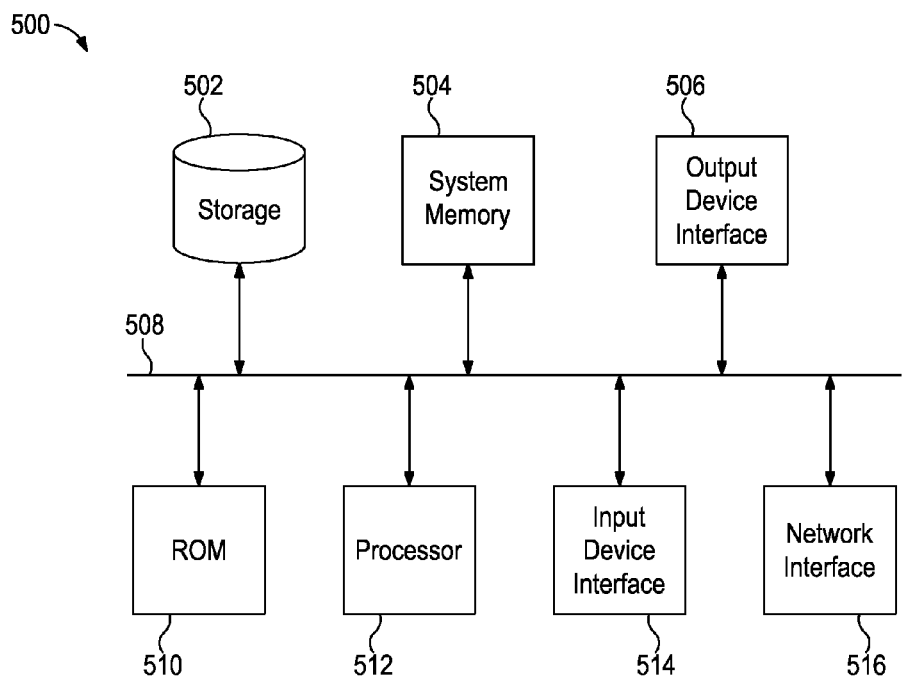
FIG. 5 conceptually illustrates an electronic system with which embodiments of the subject technology may be implemented.

FIG. 5 conceptually illustrates an electronic system 500 with which embodiments of the subject technology may be implemented. The electronic system 500, for example, can be a reader, a tag, a computer, or any device that may be used for tracking assets, or generally any electronic device that transmits signals over a network. Such an electronic system includes various types of computer readable media and interfaces for various other types of computer readable media. The electronic system 500 includes a bus 508, processing unit(s) 512, a system memory 504, a read-only memory (ROM) 510, a permanent storage device 502, an input device interface 514, an output device interface 506, and a network interface 516, or subsets and variations thereof.

The bus 508 collectively represents all system, peripheral, and chipset buses that communicatively connect the numerous internal devices of the electronic system 500. In one or more implementations, the bus 508 communicatively connects processing unit(s) 512 with the ROM 510, the system memory 504, and the permanent storage device 502. From these various memory units, processing unit(s) 512 retrieves instructions to execute and data to process in order to execute the processes of the subject disclosure. The processing unit(s) can be a single processor or a multi-core processor in different implementations.

The ROM 510 stores static data and instructions that are needed by processing unit(s) 512 and other modules of the electronic system. The permanent storage device 502, on the other hand, is a read-and-write memory device. This device is a non-volatile memory unit that stores instructions and data even when the electronic system 500 is off. One or more implementations of the subject disclosure may use a mass-storage device (such as a magnetic or optical disk and its corresponding disk drive) as the permanent storage device 502.

Other implementations may use a removable storage device (such as a floppy disk, flash drive, and its corresponding disk drive) as the permanent storage device 502. Like the permanent storage device 502, the system memory 504 is a read-and-write memory device. However, unlike the storage device 502, the system memory 504 is a volatile read-and-write memory, such as random access memory. The system memory 504 stores any of the instructions and data that processing unit(s) 512 needs at runtime. In one or more implementations, the processes of the subject disclosure are stored in the system memory 504, the permanent storage device 502, and/or the ROM 510. From these various memory units, processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices used with the input device interface 514 may include, for example, alphanumeric keyboards and pointing devices (also called "cursor control devices"). The output device interface 506 enables, for example, the display of images generated by the electronic system 500. The output devices used with the output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 may also couple the electronic system 500 to a network (not shown) through the network interface 516. In this manner, the computer can be a part of a network of computers (such as a local area network ("LAN"), a wide area network ("WAN"), or an Intranet, or a network of networks, such as the Internet). Any or all components of the electronic system 500 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Embodiments disclosed herein include:

A. A method for tracking assets that includes generating a tracking identifier for an asset, and storing the tracking identifier in a wireless tag associated with the asset. The tracking identifier may include a protocol identifier that identifies a protocol used for generating the tracking identifier, an asset identifier that identifies a class to which the asset belongs, at least one data load that identifies an element specific to the asset, at least one data load type identifier that identifies a type of a corresponding element specific to the asset or provides an end-of-data indication, and at least one data load size identifier that identifies a size of a corresponding data load.

B. A system for tracking assets that includes a tracker identification module configured to generate a tracking identifier for an asset, and a storage module configured to store the tracking identifier. The tracking identifier may include a protocol identifier that identifies a protocol associated with generating the tracking identifier, an asset identifier that identifies a class to which the asset belongs, at least one data load that identifies an element specific to the asset, at least one data load type identifier that identifies a type of a corresponding element specific to the asset or provides an end-of-data indication, and at least one data load size identifier that identifies a size of a corresponding data load.

C. A method for tracking assets that includes transmitting, to a wireless tag associated with an asset, a request for a tracking identifier for the asset, and receiving the tracking identifier from the wireless tag in response to the request. The tracking identifier may include a protocol identifier that identifies a protocol associated with generating the tracking identifier, an asset identifier that identifies a class to which the asset belongs, at least one data load that identifies an element specific to the asset, at least one data load type identifier that identifies a type of a corresponding element specific to the asset or provides an end-of-data indication, and at least one data load size identifier that identifies a size of a corresponding data load.

Each of embodiments A, B, and C may have one or more of the following additional elements in any combination: Element 1: wherein the wireless tag is at least one of integrated with, coupled to, and embedded within the asset. Element 2: wherein the wireless tag is at least one of a radio-frequency identification (RFID) tag or a near-field communication (NFC) tag. Element 3: wherein the protocol identifier precedes the asset identifier, which precedes the at least one data load type identifier, which precedes the at least one data load size identifier, which precedes the at least one data load. Element 4: wherein the at least one data load type identifier comprises a first data load type identifier and a second data load type identifier, wherein the second data load type identifier provides the end-of-data indication, wherein the at least one data load size identifier comprises a first data load size identifier, wherein the at least one data load comprises a first data load that identifies a first element specific to the asset, and wherein the protocol identifier precedes the asset identifier, which precedes the first data load type identifier, which precedes the first data load size identifier, which precedes the first data load, which precedes the second data load type identifier. Element 5: wherein the protocol identifier precedes the asset identifier, which precedes the at least one data load size identifier, which precedes the at least one data load type identifier, which precedes the at least one data load. Element 6: wherein the at least one data load type identifier comprises a first data load type identifier and a second data load type identifier, wherein the at least one data load size identifier comprises a first data load size identifier and a second data load size identifier, wherein the at least one data load comprises a first data load that identifies a first element specific to the asset and a second data load that identifies a second element specific to the asset, and wherein the protocol identifier precedes the asset identifier, which precedes the first data load type identifier, which precedes the first data load size identifier, which precedes the first data load, which precedes the second data load type identifier, which precedes the second data load size identifier, which precedes the second data load. Element 7: wherein the at least one data load type identifier comprises a third data load type identifier that provides the end-of-data indication, and wherein the second data load precedes the third data load type identifier. Element 8: wherein a size of the protocol identifier is at least five bytes, wherein a size of the asset identifier is at least one byte, wherein a size of each of the at least one data load type identifier is at least one byte, and wherein a size of each of the at least one data load size identifier is at least one byte. Element 9: wherein at least one of the protocol identifier or the at least one data load is encoded in the American Standard Code for Information Interchange (ASCII). Element 10: wherein the class comprises at least one of an iron/discharge manifold equipment class or a general vehicle class. Element 11: wherein the type an element specific to the asset comprises at least one of a manufacturer serial number, a SAP equipment identification, or a manufacturer name. Element 12: further comprising receiving input to generate the tracking identifier, wherein the tracking identifier is generated based on the input. Element 13: further comprising receiving a request for the tracking identifier, and transmitting the tracking identifier in response to receiving the request.

Element 14: further comprising a communication module configured to receive input to generate the tracking identifier, wherein the tracking identifier is generated based on the input. Element 15: further comprising a communication module configured to receive a request for the tracking identifier and to transmit the tracking identifier in response to receiving the request.

Element 16: further comprising determining asset identification information based on the received tracking identifier, the asset identification information comprising at least one of the protocol, the class, the element specific to the asset, the type of the element, the size of the at least one data load, or the end-of-data indication, and displaying the asset identification information. Element 17: wherein determining the asset information based on the received tracking identifier comprises verifying the protocol identified by the protocol identifier, and wherein if the protocol is verified, determining the asset information based on the received tracking identifier further comprises determining the class based on the asset identifier, determining whether a first data load of the at least one data load is available based on the at least one data load type identifier, determining the size of the first data load based on the at least one data load size identifier, determining an element specific to the asset identified by the first data load, and identifying the end-of-data indication based on the at least one data load type identifier.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for tracking assets, the method comprising:
   generating a tracking identifier for an asset; and
   storing the tracking identifier in a wireless tag associated with the asset;
   wherein the tracking identifier comprises:
      a protocol identifier that identifies a protocol used for generating the tracking identifier;
      an asset identifier that identifies a class to which the asset belongs;
      at least one data load that identifies an element specific to the asset;
      a first data load type identifier that identifies a type of a corresponding element specific to the asset and a second data load type identifier that provides an end-of-data indication; and
      at least one data load size identifier that identifies a size of a corresponding data load.

2. The method of claim 1, wherein the wireless tag is at least one of integrated with, coupled to, and embedded within the asset.

3. The method of claim 1, wherein the wireless tag is at least one of a radio-frequency identification (RFID) tag or a near-field communication (NFC) tag.

4. The method of claim 1, wherein the protocol identifier precedes the asset identifier, which precedes the first data load type identifier, which precedes the at least one data load size identifier, which precedes the at least one data load, which precedes the second data load type identifier.

5. The method of claim 4,
   wherein the at least one data load size identifier comprises a first data load size identifier,
   wherein the at least one data load comprises a first data load that identifies a first element specific to the asset, and
   wherein the protocol identifier precedes the asset identifier, which precedes the first data load type identifier, which precedes the first data load size identifier, which precedes the first data load, which precedes the second data load type identifier.

6. The method of claim 1, wherein the protocol identifier precedes the asset identifier, which precedes the at least one data load size identifier, which precedes the first data load type identifier, which precedes the at least one data load, which precedes the second data load type identifier.

7. The method of claim 1,
   wherein the tracking identifier further comprises a third data load type identifier,
   wherein the at least one data load size identifier comprises a first data load size identifier and a second data load size identifier,
   wherein the at least one data load comprises a first data load that identifies a first element specific to the asset and a second data load that identifies a second element specific to the asset, and
   wherein the protocol identifier precedes the asset identifier, which precedes the first data load type identifier, which precedes the first data load size identifier, which precedes the first data load, which precedes the third data load type identifier, which precedes the second data load size identifier, which precedes the second data load, which precedes the second data load type identifier.

8. The method of claim 1,
wherein a size of the protocol identifier is at least five bytes,
wherein a size of the asset identifier is at least one byte,
wherein a size of each of the first and second data load type identifiers is at least one byte, and
wherein a size of each of the at least one data load size identifier is at least one byte.

9. The method of claim 1, wherein at least one of the protocol identifier or the at least one data load is encoded in the American Standard Code for Information Interchange (ASCII).

10. The method of claim 1, wherein the class comprises at least one of an iron/discharge manifold equipment class or a general vehicle class.

11. The method of claim 1, wherein the type of the corresponding element specific to the asset comprises at least one of a manufacturer serial number, a SAP equipment identification, or a manufacturer name.

12. The method of claim 1, wherein generating the tracking identifier for the asset comprises receiving an input and generating the tracking identifier based on the input.

13. The method of claim 1, further comprising:
receiving a request for the tracking identifier; and
transmitting the tracking identifier in response to receiving the request.

14. A system for tracking assets, the system comprising:
a tracker identification module configured to generate a tracking identifier for an asset; and
a storage module configured to store the tracking identifier, wherein the tracking identifier comprises:
  a protocol identifier that identifies a protocol associated with generating the tracking identifier;
  an asset identifier that identifies a class to which the asset belongs;
  at least one data load that identifies an element specific to the asset;
  a first data load type identifier that identifies a type of a corresponding element specific to the asset and a second data load type identifier that provides an end-of-data indication; and
  at least one data load size identifier that identifies a size of a corresponding data load.

15. The system of claim 14, further comprising a communication module configured to receive input to generate the tracking identifier, wherein the tracking identifier is generated by the tracker identification module based on the input.

16. The system of claim 14, further comprising a communication module configured to receive a request for the tracking identifier and to transmit the tracking identifier in response to receiving the request.

17. A method for tracking assets, the method comprising:
transmitting, to a wireless tag associated with an asset, a request for a tracking identifier for the asset; and
receiving the tracking identifier from the wireless tag in response to the request,
wherein the tracking identifier comprises:
  a protocol identifier that identifies a protocol associated with generating the tracking identifier;
  an asset identifier that identifies a class to which the asset belongs;
  at least one data load that identifies an element specific to the asset;
  a first data load type identifier that identifies a type of a corresponding element specific to the asset and a second data load type identifier that provides an end-of-data indication; and
  at least one data load size identifier that identifies a size of a corresponding data load.

18. The method of claim 17, further comprising:
determining asset identification information based on the received tracking identifier, the asset identification information comprising at least one of the protocol, the class, the element specific to the asset, the type of the element, the size of the at least one data load, or the end-of-data indication; and
displaying the asset identification information.

19. The method of claim 18,
wherein determining the asset identification information based on the received tracking identifier comprises verifying the protocol identified by the protocol identifier, and
wherein if the protocol is verified, determining the asset identification information based on the received tracking identifier further comprises:
determining the class based on the asset identifier;
determining whether a first data load of the at least one data load is available based on the first data load type identifier;
determining the size of the first data load based on the at least one data load size identifier;
determining an element specific to the asset identified by the first data load; and
identifying the end-of-data indication based on the second data load type identifier.

* * * * *